(12) United States Patent
Kim et al.

(10) Patent No.: US 8,798,481 B2
(45) Date of Patent: Aug. 5, 2014

(54) METHOD AND SYSTEM FOR COMPENSATION OF LASER PHASE/FREQUENCY NOISE IN AN OPTICAL DEVICE

(75) Inventors: Inwoong Kim, Allen, TX (US); Olga I. Vassilieva, Plano, TX (US)

(73) Assignee: Fujitsu Limited, Kawasaki-shi (JP)

( * ) Notice: Subject to any disclaimer, the term of this patent is extended or adjusted under 35 U.S.C. 154(b) by 198 days.

(21) Appl. No.: 12/967,601

(22) Filed: Dec. 14, 2010

(65) Prior Publication Data

US 2012/0148232 A1 Jun. 14, 2012

(51) Int. Cl.
*H04B 10/04* (2006.01)

(52) U.S. Cl.
USPC .............. 398/194; 398/25; 398/186; 398/185

(58) Field of Classification Search
None
See application file for complete search history.

(56) References Cited

U.S. PATENT DOCUMENTS

| 4,847,477 A * | 7/1989 | Smith ........................ 250/201.9 |
| 2004/0161246 A1 * | 8/2004 | Matsushita et al. ............ 398/187 |
| 2008/0025728 A1 * | 1/2008 | Shpantzer et al. ............ 398/104 |

OTHER PUBLICATIONS

Bagheri et al., "Semiconductor laser phase-noise concellation using an electrical feed-forward scheme", Oct. 1, 2009, Optics Letters, vol. 34, No. 19, pp. 2979-2981.*
Heismann et al., "Signal Tracking and Performance Monitoring in Multi-Wavelength Optical Networks", Sep. 1996, 22nd European Conference on Optical Communication—ECOC'96, Oslo, pp. 3.47-3.50.*
Camatel et al., "Narrow Linewidth CW Laser Phase Noise Characterization Methods for Coherent Transmission System Applications", Sep. 1, 2008, IEEE Journal of Lightwave Technology, vol. 26, No. 17, pp. 3048-3055.*
Shieh et al.; "Equalization-enhanced phase noise for coherent-detection systems using electronic digital signal processing"; Optics Express, vol. 16, No. 20; pp. 10, 2008.
Bagheri et al.; "Semiconductor laser phase-noise cancellation using an electrical feed-forward scheme"; Optics Letters, vol. 34, No. 19; pp. 2979-2981, Oct. 1, 2009.

* cited by examiner

*Primary Examiner* — Ken Vanderpuye
*Assistant Examiner* — David Lambert
(74) *Attorney, Agent, or Firm* — Baker Botts L.L.P.

(57) ABSTRACT

In accordance with embodiments of the present disclosure, a method for compensation of noise in an optical device is provided. The method may include calculating noise present in an optical carrier signal. The method may also include generating quadrature amplitude modulation input signals, the quadrature amplitude modulation input signals each including a term for compensation of the noise based on the calculated noise. The method may further include modulating the optical carrier signal to generate a modulated optical signal based on quadrature amplitude modulation input signals.

14 Claims, 4 Drawing Sheets

US 8,798,481 B2

METHOD AND SYSTEM FOR COMPENSATION OF LASER PHASE/FREQUENCY NOISE IN AN OPTICAL DEVICE

TECHNICAL FIELD OF THE INVENTION

The present invention relates generally to optical networks and, more particularly, to a method and system for compensation of laser phase and frequency noise in an optical device.

BACKGROUND

Telecommunications systems, cable television systems and data communication networks use optical networks to rapidly convey large amounts of information between remote points. In an optical network, information is conveyed in the form of optical signals through optical fibers. Optical fibers comprise thin strands of glass capable of communicating the signals over long distances with very low loss. An optical network may be configured to combine modulated signals at various wavelengths or optical frequencies (also known as "channels") into a single optical fiber. Each disparate channel may include optically encoded information to be communicated throughout the optical network. Such combining of various channels into a single fiber is known as wavelength-division multiplexing (WDM).

An optical signal may have phase noise due to finite line width of the laser providing a source of electromagnetic energy for a fiber. Such laser phase noise combined with dispersion may limit transmission performance of high spectral efficient optical QAM signal in coherent optical communication systems by causing equalization-enhanced phase noise at the coherent receiver. Phase noise is the frequency domain representation of rapid, short-term, random fluctuations in the phase of a waveform, caused by time domain instabilities that are sometimes known "jitter." Signal degradation due to laser phase noise combined with chromatic dispersion may be significant, especially when optical signals are created using a distributed feedback (DFB) laser.

Traditional approaches to solving the problem of phase noise-induced crosstalk include the use of lasers with narrow line widths. However, narrow line width lasers are often more expensive and complicated than wider line width lasers, and thus, may often be undesirable due to such cost.

SUMMARY

In accordance with embodiments of the present disclosure, a method for compensation of noise in an optical device is provided. The method may include calculating noise present in an optical carrier signal. The method may also include generating quadrature amplitude modulation input signals, the quadrature amplitude modulation input signals each including a term for compensation of the noise based on the estimated noise. The method may further include modulating the optical carrier signal to generate a modulated optical signal based on quadrature amplitude modulation input signals.

Technical advantages of one or more embodiments of the present invention may include reduction or elimination of phase noise and/or frequency noise in an optical system, without the need of employing lower line width laser sources.

It will be understood that the various embodiments of the present invention may include some, all, or none of the enumerated technical advantages. In addition, other technical advantages of the present invention may be readily apparent to one skilled in the art from the figures, description and claims included herein.

BRIEF DESCRIPTION OF THE DRAWINGS

For a more complete understanding of the present invention and its features and advantages, reference is now made to the following description, taken in conjunction with the accompanying drawings, in which.

DETAILED DESCRIPTION

Figure 1:
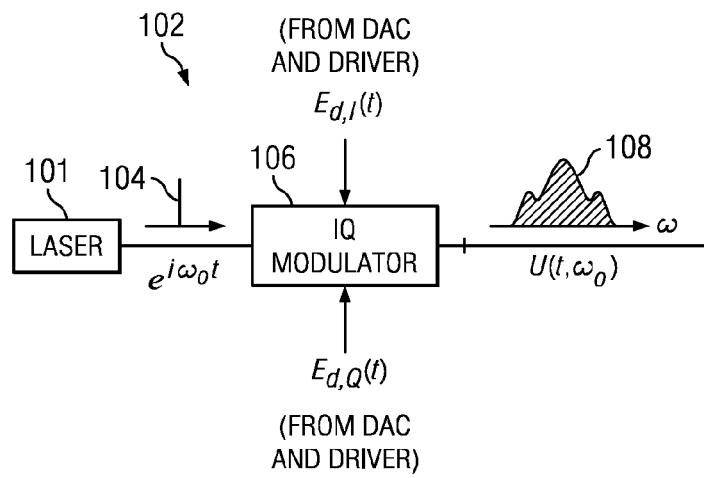
FIG. 1 illustrates selected components of an example optical transmitter with an ideal zero line width laser, in accordance with embodiments of the present disclosure.

FIG. 1 illustrates selected components of an example optical transmitter 102 with an ideal zero line width laser 101, in accordance with certain embodiments of the present disclosure. As shown in FIG. 1, laser 101 may emit a signal 104 of electromagnetic energy. Signal 104 may be represented by the expression $e^{i\omega_o t}$, where $\omega_o$ is the optical carrier angular frequency of signal 104. Optical IQ modulator 106 may perform quadrature amplitude modulation (QAM) on signal 104 to generate a modulated optical signal 108 at its output. IQ modulator 106 may generate modulated output signal 108 based on electrical QAM signals $E_{d,I}(t)$ and $E_{d,Q}(t)$ input to IQ modulator 106, as is known in the art. In optical transmitter 102 depicted in FIG. 1, modulated output signal 108 may be expressed by $U(t, \omega_0)$, where:

$$U(t,\omega_0)=\overline{E}_d(t)e^{i\omega_0 t}=(E_{d,I}(t)+iE_{d,Q}(t))e^{i\omega_0 t}$$

where $\overline{E}_d(t)$ is the complex QAM data modulation (i.e., $\overline{E}_d(t)=E_{d,I}(t)+iE_{d,Q}(t)$).

Figure 2A:
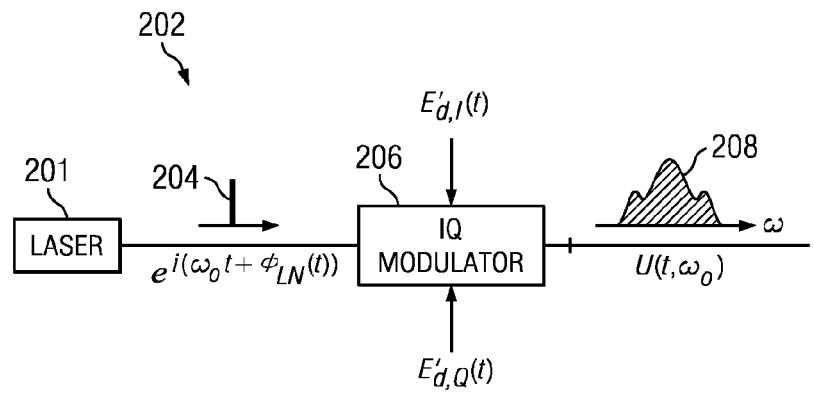
FIG. 2A illustrates selected components of an example optical transmitter with a finite line width laser and depicts laser phase noise compensation, in accordance with embodiments of the present disclosure.

FIG. 2A illustrates selected components of an example optical transmitter 202 with a finite line width laser 201 and depicts laser phase noise compensation of an optical signal 204, in accordance with certain embodiments of the present disclosure. Transmitter 202 may include any transmitter or other suitable device configured to transmit optical signals. Transmitter 202 may be configured to receive information and transmit a modulated optical signal 208 at a certain wavelength. Transmitter 202 may also be configured to transmit this optically encoded information on the associated wavelength.

As depicted in FIG. 2A, transmitter may include a finite line width laser 201 and an IQ modulator 206. Laser 201 may be any system, device, or apparatus configured to emit a signal 204 of electromagnetic energy. Signal 204 may be represented by the expression $e^{i(\omega_0 t + \phi_{LN}(t))}$, where $\omega_0$ is the optical carrier angular frequency of signal 204 and $\phi_{LN}(t)$ is the phase noise of carrier signal 204 as a function of time.

Optical IQ modulator 206 may include any suitable modulator or other suitable device configured to perform QAM on an optical carrier signal (e.g., optical signal 204) to generate a modulated signal (e.g., optical signal 208) at its output. IQ modulator 206 may generate a modulated output signal 208 based on electrical QAM input signals $E'_{d,I}(t)$ and $E'_{d,Q}(t)$ input to IQ modulator 206, as is known in the art. Electrical QAM input signals $E'_{d,I}(t)$ and $E'_{d,Q}(t)$ may have a certain relation to electrical QAM input signals $E_{d,I}(t)$ and $E_{d,Q}(t)$ of transmitter 102 depicted in FIG. 1, but may also include terms equal to but opposite in phase from the phase noise $\phi_{LN}(t)$. For example, if:

$$E'_{d,I}(t) = E_{d,I}(t)\cos(-\phi_{LN}(t)) - E_{d,I}(t)\sin(-\phi_{LN}(t)) \text{ and}$$

$$E'_{d,Q}(t) = E_{d,Q}(t)\cos(-\phi_{LN}(t)) - E_{d,Q}(t)\sin(-\phi_{LN}(t)),$$

then modulated output signal 208 may be may be expressed by $U(t, \omega_0)$, where:

$$U(t,\omega_0) = (E'_{d,I}(t) + iE'_{d,Q}(t))e^{i(\omega_0 t + \phi_{LN}(t))} =$$
$$(E_{d,I}(t) + iE_{d,Q}(t))e^{-i\phi_{LN}(t)}e^{i(\omega_0 t + \phi_{LN}(t))} =$$
$$(E_{d,I}(t) + iE_{d,Q}(t))e^{i\omega_0 t}$$

Thus, it is seen that if the electrical QAM input signals to IQ modulator 206 are modified as described above to account for laser phase noise, modulated output signal 208 has the same characteristic as modulated output signal 108, meaning that laser phase noise is cancelled by the modification to the electrical QAM input signals to IQ modulator 206.

The phase noise terms may be added to the QAM input signals to IQ modulator 206 based on a measurement of the phase noise as described in greater detail below with respect to FIGS. 3 and 4.

Figure 2B:
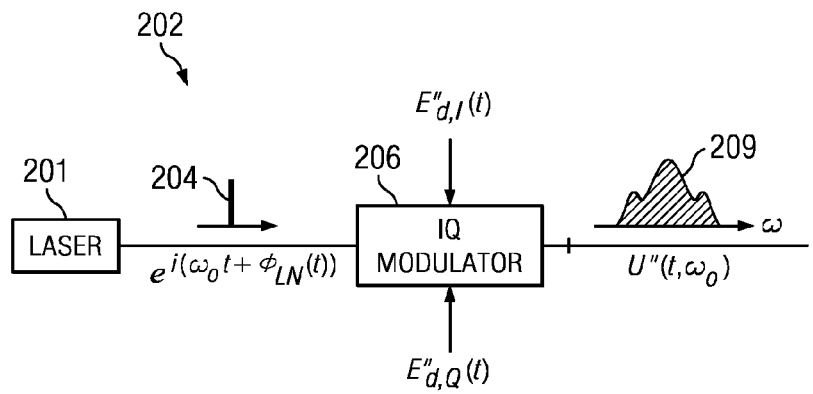
FIG. 2B illustrates the example optical transmitter shown in FIG. 2A and depicts laser phase noise compensation and wavelength tracking, in accordance with embodiments of the present disclosure.

FIG. 2B illustrates example optical transmitter 202 shown in FIG. 2A and depicts laser phase noise compensation and wavelength tracking, in accordance with certain embodiments of the present disclosure. Wavelength tracking generally means a method by which a network management system can track the path of a given optical channel from ingress to egress as it travels across the optical network. Such tracking may provide channel inventory, define quality of service parameters for various wavelengths, and/or provide diagnostics for an optical channel path.

As shown in FIG. 2B, IQ modulator 206 may generate a modulated output signal 209 based on electrical QAM input signals $E''_{d,I}(t)$ and $E''_{d,Q}(t)$ input to IQ modulator 206, as is known in the art. Electrical QAM input signals $E''_{d,I}(t)$ and $E''_{d,Q}(t)$ may have a certain relation to electrical QAM input signals $E'_{d,I}(t)$ and $E'_{d,Q}(t)$ depicted in FIG. 2A, but may also include terms for wavelength tracking. For example, if:

$$E''_{d,I}(t) = E_{d,I}(t)\cos(2\pi A_f \sin(2\pi f_p t + x_d(t)) - \phi_{LN}(t)) - E_{d,I}(t)\sin(2\pi A_f \sin(2\pi f_p t + x_d(t)) - \phi_{LN}(t)),$$

$$E''_{d,Q}(t) = E_{d,Q}(t)\cos(2\pi A_f \sin(2\pi f_p t + x_d(t)) - \phi_{LN}(t)) - E_{d,Q}(t)\sin(2\pi A_f \sin(2\pi f_p t + x_d(t)) - \phi_{LN}(t)), \text{ and}$$

where $f_p$ is the pilot tone frequency associated with the wavelength to be tracked, $x_d(t)$ is the tracking data, and $A_f$ is the maximum frequency deviation. To perform wavelength tracking, the optical carrier may be slowly modulated with a pilot tone frequency of the tracking data. The pilot tone frequency may be an order of kHz and may be at the outside of the QAM data bandwidth. The modulated output signal 209 may be may be expressed by $U''(t, \omega_0)$, where:

$$U''(t,\omega_0) = (E''_{d,I}(t) + iE''_{d,Q}(t))e^{i(\omega_0 t + \phi_{LN}(t))} =$$
$$(E_{d,I}(t) + iE_{d,Q}(t))e^{i(2\pi A_f \sin(2\pi f_p t + x_d(t)) - \phi_{LN}(t))}e^{i(\omega_0 t + \phi_{LN}(t))} =$$
$$(E_{d,I}(t) + iE_{d,Q}(t))e^{i(\omega_0 t + 2\pi A_f \sin(2\pi f_p t + x_d(t)))}$$

Thus, it is seen that if the electrical QAM input signals to IQ modulator 206 are modified as described above to account for laser phase noise and introduce wavelength tracking, modulated output signal 209 has the same characteristic as modulated output signal 108, except for terms allowing for wavelength tracking, meaning that laser phase noise is cancelled by the modification to the electrical QAM input signals to optical IQ modulator 206.

The phase noise terms and wavelength tracking terms may be added to the QAM input signals to optical IQ modulator 206 based as described in greater detail below with respect to FIGS. 3 and 4.

Figure 3:
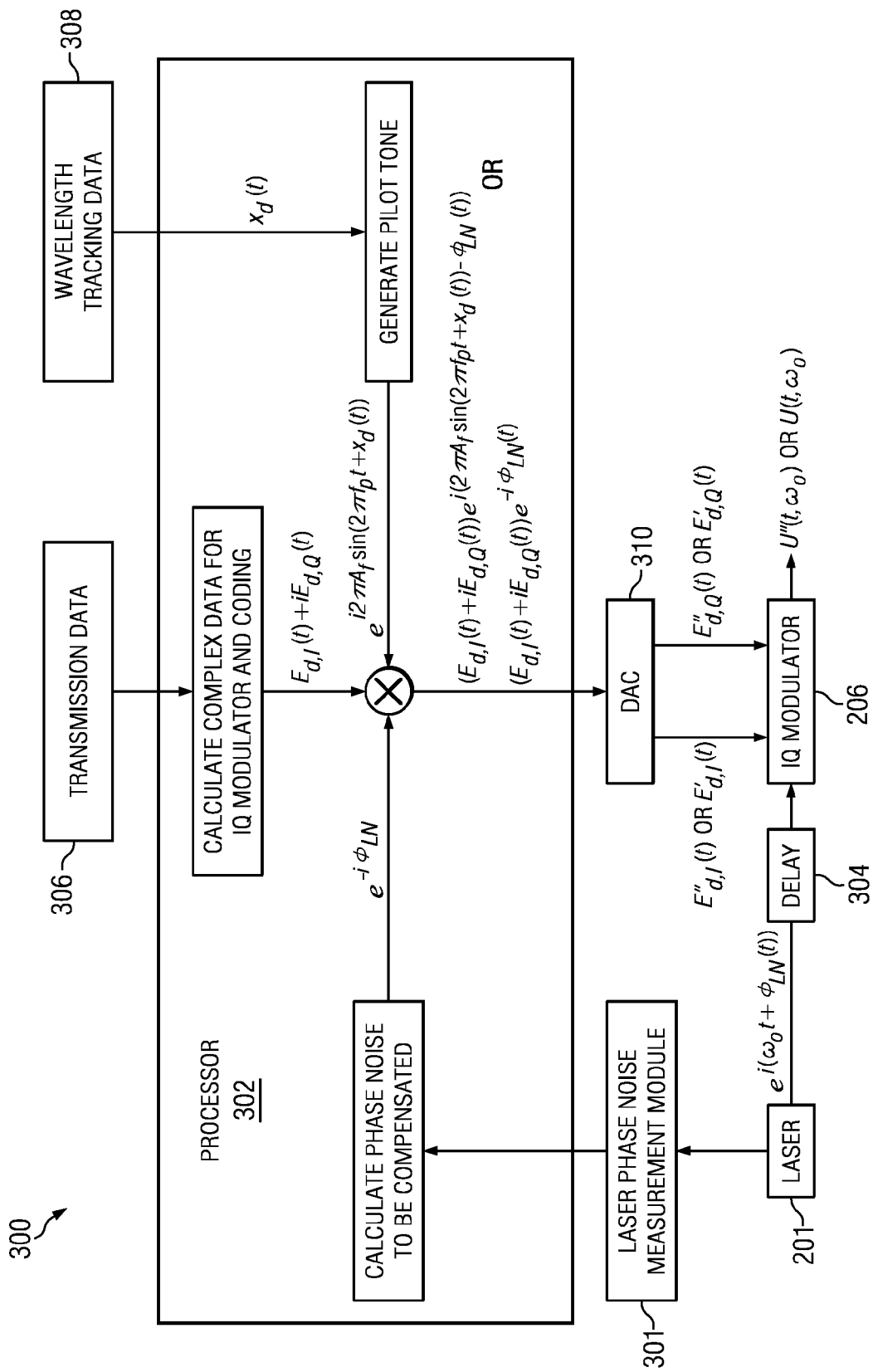
FIG. 3 illustrates selected components of a system for compensation of laser phase noise in an optical device, in accordance with embodiments of the present disclosure.
Figure 4:
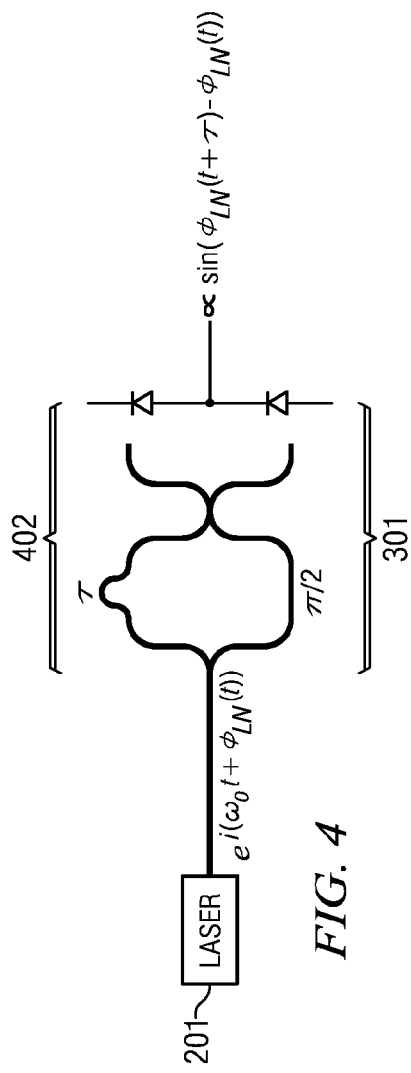
FIG. 4 depicts an example laser phase noise measurement module, in accordance with embodiments of the present disclosure.

FIG. 3 illustrates selected components of a system 300 for compensation of laser phase noise in an optical device, in accordance with certain embodiments of the present disclosure. In some embodiments, system 300 may comprise or be part of an optical transmitter. As shown in FIG. 3, system 300 may include a laser 201, a delay module 304, and optical IQ modulator 206, a laser phase noise measurement module 301, a processor 302, a source of transmission data 306, a source of wavelength tracking data 308, and a digital-to-analog converter (DAC) 310. Laser 201 may be similar to laser 201 depicted in FIGS. 2A and 2B, and may generate a signal with the characteristic $e^{i(\omega_0 t + \phi_{LN}(t))}$, where $\phi_{LN}(t)$ is the phase noise of carrier signal 204 as a function of time. IQ modulator 206 may be similar to IQ modulator 206 depicted in FIGS. 2A and 2B.

Laser phase noise measurement module 301 may include any system, device or apparatus configured to, based on a received laser signal (e.g., from laser 201), measure laser phase noise present in the laser signal. FIG. 4 depicts an example laser phase noise measurement module 301, in accordance with embodiments of the present disclosure. As shown in FIG. 4, laser phase noise measurement module 301 may comprise balanced photodetectors and a delay line interferometer 402 (e.g., a Mach-Zehnder interferometer or Michelson interferometer). Delay interferometer 402 may receive a laser signal generated by laser 201 and represented by the characteristic $e^{i(\omega_0 t + \phi_{LN}(t))}$ where $\phi_{LN}(t)$ is the phase noise of the laser signal as a function of time. Delay line interferometer may split the laser into two beams, in which one beam is time-delayed relative to the other by a desired interval of $\tau$ with phase offset of $\pi/2$ (e.g., as shown in FIG. 4). Using such an approach, phase noise $\phi_{LN}(t)$ may be estimated based on the following equation (which may be solved by processor 302, or another suitable device of system 300):

$$\frac{d\phi_{LN}(t)}{dt}\tau \approx \phi_{LN}(t+\tau) - \phi_{LN}(t) \approx \sin(\phi_{LN}(t+\tau) - \phi_{LN}(t))$$

for $$|\phi_{LN}(t+\tau) - \phi_{LN}(t)| \ll 1$$

Processor 302 may include any system, device, or apparatus configured to interpret and/or execute program instructions and/or process data, and may include, without limitation a microprocessor, microcontroller, digital signal processor (DSP), application specific integrated circuit (ASIC), or any other digital or analog circuitry configured to interpret and/or execute program instructions and/or process data. As depicted in FIG. 3, processor 302 may calculate the electrical QAM input signals or complex signals for optical IQ modulator 206 in accordance with the flow chart depicted within the block for processor 302. For example, processor 302 may estimate the laser phase (or frequency) noise of laser 201 or some other parameter indicative of such noise. For example, in some embodiments the time differential of the laser phase may be measured, and a processor or other device may estimate laser phase noise based on such measurement. As another example, in some embodiments, a laser frequency error measurement module, which measures angular frequency error $\omega_{error}$ of laser 201, where $\omega_{error}(t)=\omega(t)-\omega_0$, may be used instead of laser phase noise measurement module 301. In this case, $\omega(t)$ is the angular frequency of laser and $\omega_0$ will be the targeted angular frequency. Based on such measurement, processor 302 may calculate the phase noise to be compensated $\phi_{LN}(t)=\int \omega_{error}(t)dt$, to generate a compensation term $e^{-i\phi_{LN}(t)}$ for the electrical QAM input signals. As a further example, in some embodiments, processor 302 may be able to calculate phase noise based on measurement performed by laser phase noise measurement module 301.

In addition, processor 302 may read data 306 and calculate the modulation components $E_{d,I}(t)+iE_{d,Q}(t))$ for the electrical QAM input signals. Furthermore, processor 302 may read wavelength tracking data and generate a pilot tone with $e^{i2\pi A_f \sin(2\pi f_p t + x_d(t))}$ for the electrical QAM input signals. In some embodiments, generation of a pilot tone for wavelength tracking may be optional or otherwise not performed, in which case the term $e^{i2\pi A_f \sin(2\pi f_p t + x_d(t))}$ is not calculated.

As shown in FIG. 3, processor 302 may sum terms for the modulation components, phase noise compensation, and (if present) pilot tone for wavelength tracking in order to generate the electrical QAM input signals as digital signals. DAC 310 may be configured to receive the digital signals from processor 302 and convert such digital signals into an analog electrical QAM input signals.

Delay module 304 may be any system, device, or apparatus configured to process a signal at its input and generate a time-delayed version of the input signal at its output. In system 300, such delay may be necessary to compensate for the time required by processor 302 to measure and/or calculate the phase noise to be compensated and feed-forward such compensation to IQ modulator 206.

As shown in FIG. 3, IQ modulator 206 may generate a modulated output signal $U'''(t, \omega_0)$ based on electrical QAM input signals $E'_{d,I}(t)$ and $E''_{d,Q}(t)$ input to IQ modulator 206 in embodiments in which both phase noise compensation and wavelength tracking are utilized. Alternatively, IQ modulator may generate a modulated output signal $U(t, \omega_0)$ based on electrical QAM input signals $E'_{d,I}(t)$ and $E'_{d,Q}(t)$ input to IQ modulator 206 in embodiments in phase noise compensation, but not wavelength tracking, is utilized.

Figure 5:
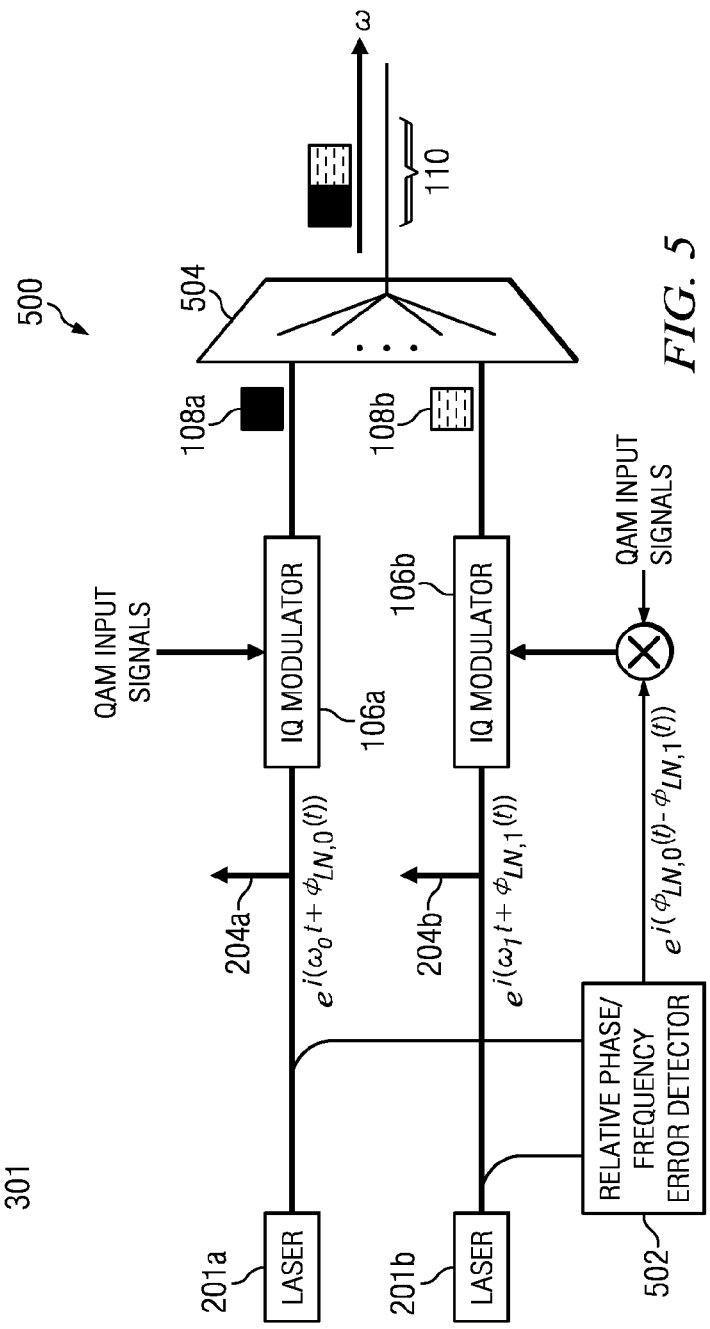
FIG. 5 depicts an example optical system depicting an application of laser phase noise compensation for wavelength division multiplexing, in accordance with embodiments of the present disclosure.

FIG. 5 depicts an example optical system 500 depicting an application of laser phase compensation for wavelength division multiplexing, in accordance with embodiments of the present disclosure. As shown in FIG. 5, system 500 may include a relative phase/frequency error detector, IQ modulators 106, and a multiplexer 504. Utilizing system 500, lasers 201a and 201b may each generate a corresponding carrier signal 204a and 204b, having the characteristics $e^{i(\omega_0 t + \phi_{LN,0}(t))}$ and $e^{i(\omega_1 t + \phi_{LN,1}(t))}$, respectively, where $\phi_{LN,0}(t)$ is the phase noise of carrier signal 204a as a function of time and where $\phi_{LN,1}(t)$ is the phase noise of carrier signal 204b as a function of time.

Figure 6:
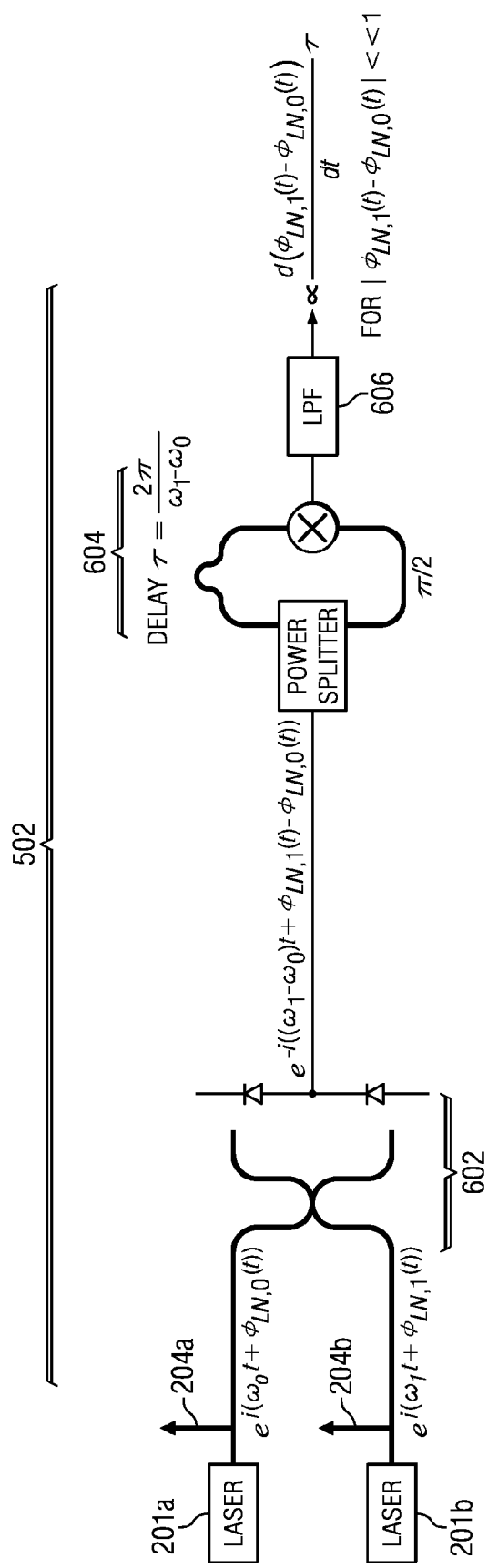
FIG. 6 depicts an example error detector of the system depicted in FIG. 5, in accordance with embodiments of the present disclosure.

Error detector 502 may comprise any system, device or apparatus configured to receive and compare carrier signals 204a and 204b and, based on such comparison, generate a signal indicative of the phase error between carrier signals 204a and 204b (e.g., a signal with a characteristic $e^{i(\phi_{LN,0}(t)-\phi_{LN,1}(t))}$). FIG. 6 depicts an example error detector 502, in accordance with embodiments of the present disclosure. As depicted in FIG. 6, error detector 502 may include optical coupler and balanced photodetectors 602 and electrical delay line discriminator comprised of 604 and 606. Coupler and balanced photodetectors 602 may include any system, device, or apparatus configured to generate an intermediate RF signal representative of the difference between carrier signals 204a and 204b. Such intermediate signal may be represented by the characteristic $e^{i((\omega_1-\omega_0)t+\phi_{LN,1}(t)-\phi_{LN,0}(t))}$. Delay line mixer 604 may include any system, device, or apparatus configured to split the intermediate RF signal into two signals, in which one RF signal is time-delayed relative the other by a desired interval of $\tau$ with phase offset of $\pi/2$ (FIG. 6) and mix the signals. Low pass filter 606 may include any system, device or apparatus configured to filter high-frequency components of the mixed signal while passing low-frequency components. Low pass filter 606 (and accordingly error detector 502) may output a signal indicative of the relative phase error between carrier signals 204a and 204b.

IQ modulators 106a and 106b may modulate carrier signals 204a and 204b, respectively, based on QAM input signals to IQ modulators 106a and 106b to generate modulated signals 108a and 108b. The QAM input signals to one of IQ modulators 106a and 106b may be combined with the signal generated by error detector 502, and such combined signal may be used to modulate the corresponding carrier signal 204a or 204b.

Multiplexer 504 may be any system, device, or apparatus configured to combine modulated signals 108a and 108b into a wavelength-division multiplexed signal 110. Due to cancellation of relative phase noise between lasers, signal 110 in optical spectral domain may comprise an optical "super-channel" with high spectral efficiency allowing high data rate communication. Two optical carriers are virtually phase locked each other for super-channel, by cancelling relative phase noise, as if they come from a single optical comb source. In some embodiments, signal 100 may provide a seamless continuous optical data spectrum.

A component of transmitter 202, system 300, or system 500 may include an interface, logic, memory, and/or other suitable element. An interface receives input, sends output, processes the input and/or output, and/or performs other suitable operation. An interface may comprise hardware and/or software.

Logic performs the operations of the component, for example, executes instructions to generate output from input. Logic may include hardware, software, and/or other logic. Logic may be encoded in one or more tangible computer readable storage media and may perform operations when executed by a computer. Certain logic, such as a processor, may manage the operation of a component. Examples of a processor include one or more computers, one or more microprocessors, one or more applications, and/or other logic.

A memory stores information. A memory may comprise one or more tangible, computer-readable, and/or computer-executable storage medium. Examples of memory include computer memory (for example, Random Access Memory (RAM) or Read Only Memory (ROM)), mass storage media (for example, a hard disk), removable storage media (for example, a Compact Disk (CD) or a Digital Video Disk (DVD)), database and/or network storage (for example, a server), and/or other computer-readable medium.

Modifications, additions, or omissions may be made to transmitter 202, system 300, and/or system 500 without departing from the scope of the disclosure. The components of optical transmitter 202, system 300, and/or system 500 may be integrated or separated. Moreover, the operations of transmitter 202, system 300, and/or system 500 may be performed by more, fewer, or other components. Additionally, operations of transmitter 202, system 300, and/or system 500 may be performed using any suitable logic. As used in this document, "each" refers to each member of a set or each member of a subset of a set.

Although the present invention has been described with several embodiments, various changes and modifications may be suggested to one skilled in the art. It is intended that the present invention encompass such changes and modifications as fall within the scope of the appended claims.

What is claimed is:

1. A transmitter for use in an optical system, comprising:
   a laser configured to output an optical carrier signal, the optical output carrier signal having laser phase noise due to finite line width of the laser, the laser phase noise measured with respect to a second laser; and
   a modulator configured to modulate the optical carrier signal to output a modulated optical signal based on quadrature amplitude modulation input signals received by the modulator, the quadrature amplitude modulation input signals each including data and a term for compensation of the phase noise, the quadrature amplitude modulation input signals each further including a term for wavelength tracking, the term for wavelength tracking comprising a pilot tone frequency, tracking data, and a maximum frequency deviation, the optical carrier signal being frequency modulated with the pilot tone frequency of the tracking data.

2. A transmitter according to claim 1, the modulator comprising an optical IQ modulator.

3. A transmitter according to claim 1, wherein each term for compensation of the phase noise includes a signal representation approximately equal to and of opposite phase from the phase noise.

4. A transmitter according to claim 1, wherein each term for compensation of the phase noise is based on a measurement of a time differential of a phase of the output carrier signal.

5. A transmitter according to claim 1, wherein each term for compensation of the phase noise is based on a calculation of the phase noise, wherein the calculation of the phase noise is based on a measurement of a frequency error of the optical carrier signal.

6. A system comprising:
   a transmitter comprising:
      a laser configured to output an optical carrier signal, the optical output carrier signal having laser phase noise due to finite line width of the laser, the laser phase noise measured with respect to a second laser; and
      a modulator configured to modulate the optical carrier signal to output a modulated optical signal based on quadrature amplitude modulation input signals received by the modulator, the quadrature amplitude modulation input signals each including data and a term for compensation of the phase noise, the quadrature amplitude modulation input signals each further including a term for wavelength tracking, the term for wavelength tracking comprising a pilot tone frequency, tracking data, and a maximum frequency deviation, the optical carrier signal being frequency modulated with the pilot tone frequency of the tracking data; and
   a processor communicatively coupled to the transmitter and configured to:
      calculate the phase noise; and
      generate the quadrature amplitude modulation input signals based on the phase noise.

7. A system according to claim 6, the modulator comprising an optical IQ modulator.

8. A system according to claim 6, the processor configured to generate each term for compensation of the phase noise such that each term for compensation of the phase noise includes a signal representation approximately equal to and of opposite phase from the phase noise.

9. A system according to claim 6, the processor configured to calculate the phase noise is based on a measurement of a time differential of a phase of the output carrier signal.

10. A system according to claim 6, the processor configured to:
    measure a frequency error of the optical carrier signal, and
    calculate the phase noise based on a measurement of a frequency error of the optical carrier signal.

11. A method for compensation of noise in an optical device, comprising:
    calculating laser phase noise present in an optical carrier signal transmitted by a laser, the laser phase noise due to finite line width of the laser, the laser phase noise measured with respect to a second laser;
    generating quadrature amplitude modulation input signals, the quadrature amplitude modulation input signals each including data and a term for compensation of the noise based on the phase noise, the quadrature amplitude modulation input signals each further including a term for wavelength tracking, the term for wavelength tracking comprising a pilot tone frequency, tracking data, and a maximum frequency deviation, the optical carrier signal being frequency modulated with the pilot tone frequency of the tracking data; and
    modulating the optical carrier signal to generate a modulated optical signal based on quadrature amplitude modulation input signals.

12. A method according to claim 11, wherein each term for compensation of the phase noise includes a signal representation approximately equal to and of opposite phase from the phase noise.

13. A method according to claim 11, wherein calculating the phase noise is based on a measurement of a time differential of a phase of the output carrier signal measuring the noise.

14. A method according to claim 11, further comprising measuring a frequency error of the optical carrier signal, and wherein calculating the phase noise is based on the frequency error.

* * * * *